(12) United States Patent
Ogino

(10) Patent No.: US 6,701,075 B2
(45) Date of Patent: Mar. 2, 2004

(54) FOCUS ADJUSTING APPARATUS, IMAGE SENSING APPARATUS, FOCUSING METHOD, PROGRAM, AND STORAGE MEDIUM

(75) Inventor: Hiroyuki Ogino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 10/321,056

(22) Filed: Dec. 17, 2002

(65) Prior Publication Data

US 2003/0117517 A1 Jun. 26, 2003

(30) Foreign Application Priority Data

Dec. 20, 2001 (JP) ........................................ 2001-387575

(51) Int. Cl.$^7$ ............................................... G03B 13/36
(52) U.S. Cl. ........................ 396/101; 396/103; 396/127
(58) Field of Search ................................ 396/101, 103, 396/125, 127; 250/201.2, 201.7; 348/347, 356

(56) References Cited

U.S. PATENT DOCUMENTS 4,611,244 A * 9/1986 Hanma et al. ............... 348/347
4,903,134 A * 2/1990 Murashima et al. ........ 348/347

* cited by examiner

Primary Examiner—W. B. Perkey
(74) Attorney, Agent, or Firm—Morgan & Finnegan, LLP

(57) ABSTRACT

The present invention, employing a method of obtaining a final focus position by re-driving a lens before an actual image sensing operation in the vicinity of a focus position which has been obtained by the hill-climbing focusing method, has as its object to enable accurate focusing even in a case where a focus position is not yet obtained by the hill-climbing focusing method. To achieve this object, the driving range of the focus lens at the time of actual exposure is changed in accordance with whether or not AF operation in the hill-climbing mode has been completed and a peak position has been detected. Furthermore, a focus evaluation value is compared with a predetermined value, and the driving range of the focus lens at the time of actual exposure is changed in accordance with the comparison result.

22 Claims, 13 Drawing Sheets

FOCUS ADJUSTING APPARATUS, IMAGE SENSING APPARATUS, FOCUSING METHOD, PROGRAM, AND STORAGE MEDIUM

FIELD OF THE INVENTION

The present invention relates to an image sensing apparatus, focusing method, program, and storage medium, and more particularly, to an image sensing apparatus which always achieves a focused state by the hill-climbing focusing method, and before an actual image sensing operation, obtains a final focus position by re-driving (scanning) a lens in the vicinity of the focus position which has been achieved by the hill-climbing focusing method, a focusing method applied to said image sensing apparatus, a program which causes a computer to execute said focusing method, and a storage medium storing said program.

BACKGROUND OF THE INVENTION

Conventionally, as a focusing method of an electronic still camera or a video camera or the like, the lens position of a focus lens is adjusted so as to achieve a maximum level of a high-frequency-range component, consisting only of luminance signals in a high-frequency range among the luminance signals for one frame obtained from an image sensing device, e.g., a CCD.

Known methods of this focusing method are: the hill-climbing method which obtains a focus position by driving a lens in the increasing direction of a level of a high-frequency-range component (hereinafter referred to as a "focus evaluation value") among the luminance signals for one frame obtained from an image sensing device, and obtaining as the maximum value the focus evaluation value immediately before it decreases, and acquiring a lens position corresponding to the maximum value as the focus position; or a method which obtains a focus position by storing focus evaluation values for each of the lens positions in a predetermined focusing area while driving the lens, detecting the maximum value of the stored focus evaluation values after driving the lens across the whole driving areas, and acquiring a lens position corresponding to the maximum value as the focus position.

In these methods, normally the central area of an image sensing frame is designated as the predetermined focusing area as shown in FIG. 12, and a focus evaluation value within this area is obtained. FIG. 12 shows a focusing area of an image sensing frame. FIG. 13 shows a relation between lens positions and focus evaluation values in the predetermined focusing area. As can be seen in FIG. 13, the focus evaluation values form a mountain shape.

Furthermore, in a case of sensing a still image by an electronic still camera or a video camera, it is a known method to always achieve a focused state of an image in the electronic view finder by the aforementioned hill-climbing focusing method, and before an actual image sensing operation, re-drive (scan) the lens in the vicinity of the focus position which has been obtained by the hill-climbing focusing method to obtain a final focus position.

However, in the above-described image sensing apparatus employing the conventional method of re-driving (scanning) a lens in the vicinity of the focus position before an actual image sensing operation, for instance, in a case where the camera performs panning and then an actual image sensing operation has started before completing the hill-climbing focusing operation, the lens may scan the area that has the center different from the intended focus position, and may go out of focus.

SUMMARY OF THE INVENTION

The present invention has been proposed in consideration of the above-described problems, and has as its object to provide an image sensing apparatus, employing a method of obtaining a final focus position before an actual image sensing operation by re-driving a lens in the vicinity of a focus position which has been obtained by the hill-climbing focusing method, which enables to achieve accurate focusing even in a case where a focus position is not yet obtained by the hill-climbing focusing method, a focusing method, a program, and a storage medium.

In order to solve the above-described problems and achieve the object, a focus adjusting apparatus according to the present invention is characterized by the following configuration according to its first aspect.

According to the present invention, the foregoing object is attained by providing a focus adjusting apparatus comprising: an extraction unit adapted to receive object light through a focus lens that performs focus adjustment, and extract a signal indicative of a focus level; a first focus operation mode adapted to perform focus operation by moving the focus lens while determining a focus level based on the signal extracted by the extraction unit, and when it is determined that the focus lens has passed a position where the focus level becomes maximum, returning and stopping the focus lens at the position where the focus level becomes maximum; a second focus operation mode adapted to perform focus operation by storing signals extracted by the extraction unit at each of a plurality of positions of the focus lens while moving the focus lens across a predetermined range in response to an operation of a shutter release operation member, and moving the focus lens to a position where the focus level becomes maximum in the stored signals; and a control unit adapted to set a first range as the predetermined range of the second focus operation mode in a case where the second focus operation mode is executed after completing the focus operation of the first focus operation mode, or set a second range as the predetermined range of the second focus operation mode in a case where the second focus operation mode is executed before completing the focus operation of the first focus operation mode.

Furthermore, an image sensing apparatus according to the present invention is characterized by the following configuration according to its first aspect.

According to the present invention, the foregoing object is attained by providing an image sensing apparatus comprising a focus adjusting apparatus which includes: an extraction unit adapted to receive object light through a focus lens that performs focus adjustment, and extract a signal indicative of a focus level; a first focus operation mode adapted to perform focus operation by moving the focus lens while determining a focus level based on the signal extracted by the extraction unit, and when it is determined that the focus lens has passed a position where the focus level becomes maximum, returning and stopping the focus lens at the position where the focus level becomes maximum; a second focus operation mode adapted to perform focus operation by storing signals extracted by the extraction unit at each of a plurality of positions of the focus lens while moving the focus lens across a predetermined range in response to an operation of a shutter release operation member, and moving the focus lens to a position where the focus level becomes maximum in the stored signals; and a control unit adapted to set a first range as the predetermined range of the second focus operation mode in a case where the second focus operation mode is executed after completing the focus operation of the first focus operation mode, or set a second range as the predetermined range of the second focus operation mode in a case where the second focus operation mode is executed before completing the focus operation of the first focus operation mode.

Furthermore, a focus adjusting apparatus according to the present invention is characterized by the following configuration according to its second aspect.

According to the present invention, the foregoing object is attained by providing a focus adjusting apparatus comprising: an extraction unit adapted to receive object light through a focus lens that performs focus adjustment, and extract a signal indicative of a focus level; a first focus operation mode adapted to perform focus operation by moving the focus lens while determining a focus level based on the signal extracted by the extraction unit, and when it is determined that the focus lens has passed a position where the focus level becomes maximum, returning and stopping the focus lens at the position where the focus level becomes maximum; a second focus operation mode adapted to perform focus operation by storing signals extracted by the extraction unit at each of a plurality of positions of the focus lens while moving the focus lens across a predetermined range in response to an operation of a shutter release operation member, and moving the focus lens to a position where the focus level becomes maximum in the stored signals; and a control unit adapted to set a first range as the predetermined range of the second focus operation mode in a case where the focus level obtained in the first focus operation mode is higher than a predetermined value, or set a second range as the predetermined range of the second focus operation mode in a case where the focus level obtained in the first focus operation mode is equal to or lower than the predetermined value.

Furthermore, an image sensing apparatus according to the present invention is characterized by the following configuration according to its second aspect.

According to the present invention, the foregoing object is attained by providing an image sensing apparatus comprising a focus adjusting apparatus which includes: an extraction unit adapted to receive object light through a focus lens that performs focus adjustment, and extract a signal indicative of a focus level; a first focus operation mode adapted to perform focus operation by moving the focus lens while determining a focus level based on the signal extracted by the extraction unit, and when it is determined that the focus lens has passed a position where the focus level becomes maximum, returning and stopping the focus lens at the position where the focus level becomes maximum; a second focus operation mode adapted to perform focus operation by storing signals extracted by the extraction unit at each of a plurality of positions of the focus lens while moving the focus lens across a predetermined range in response to an operation of a shutter release operation member, and moving the focus lens to a position where the focus level becomes maximum in the stored signals; and a control unit adapted to set a first range as the predetermined range of the second focus operation mode in a case where the focus level obtained in the first focus operation mode is higher than a predetermined value, or set a second range as the predetermined range of the second focus operation mode in a case where the focus level obtained in the first focus operation mode is equal to or lower than the predetermined value.

Furthermore, a focusing method according to the present invention is characterized by the following configuration according to its first aspect.

According to the present invention, the foregoing object is attained by providing a focusing method comprising: an extraction step of receiving object light through a focus lens that performs focus adjustment and extracting a signal indicative of a focus level; a first focus operation step of performing focus operation by moving the focus lens while determining a focus level based on the signal extracted in the extraction step, and when it is determined that the focus lens has passed a position where the focus level becomes maximum, returning and stopping the focus lens at the position where the focus level becomes maximum; a second focus operation step of performing focus operation by storing signals extracted in the extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of the second focus operation step in a case where the second focus operation step is executed after completing the focus operation of the first focus operation step, or setting a second range as the predetermined range of the second focus operation step in a case where the second focus operation step is executed before completing the focus operation of the first focus operation step.

Furthermore, a focusing method according to the present invention is characterized by the following configuration according to its second aspect.

According to the present invention, the foregoing object is attained by providing a focusing method comprising: an extraction step of receiving object light through a focus lens that performs focus adjustment and extracting a signal indicative of a focus level; a first focus operation step of performing focus operation by moving the focus lens while determining a focus level based on the signal extracted in the extraction step, and when it is determined that the focus lens has passed a position where the focus level becomes maximum, returning and stopping the focus lens at the position where the focus level becomes maximum; a second focus operation step of performing focus operation by storing signals extracted in the extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of the second focus operation step in a case where the focus level obtained in the first focus operation step is higher than a predetermined value, or setting a second range as the predetermined range of the second focus operation step in a case where the focus level obtained in the first focus operation step is equal to or lower than the predetermined value.

Furthermore, a program according to the present invention is characterized by the following configuration according to its first aspect.

According to the present invention, the foregoing object is attained by providing a program which causes a computer to execute steps including: an extraction step of receiving object light through a focus lens that performs focus adjustment and extracting a signal indicative of a focus level; a first focus operation step of performing focus operation by moving the focus lens while determining a focus level based on the signal extracted in the extraction step, and when it is determined that the focus lens has passed a position where the focus level becomes maximum, returning and stopping the focus lens at the position where the focus level becomes maximum; a second focus operation step of performing focus operation by storing signals extracted in the extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of the second focus operation step in a case where the second focus operation step is executed after completing the focus operation of the first focus operation step, or setting a second range as the predetermined range of the second focus operation step in a case where the second focus operation step is executed before completing the focus operation of the first focus operation step.

Furthermore, a program according to the present invention is characterized by the following configuration according to its second aspect.

According to the present invention, the foregoing object is attained by providing a program which causes a computer to execute steps including: an extraction step of receiving object light through a focus lens that performs focus adjustment and extracting a signal indicative of a focus level; a first focus operation step of performing focus operation by moving the focus lens while determining a focus level based on the signal extracted in the extraction step, and when it is determined that the focus lens has passed a position where the focus level becomes maximum, returning and stopping the focus lens at the position where the focus level becomes maximum; a second focus operation step of performing focus operation by storing signals extracted in the extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of the second focus operation step in a case where the focus level obtained in the first focus operation step is higher than a predetermined value, or setting a second range as the predetermined range of the second focus operation step in a case where the focus level obtained in the first focus operation step is equal to or lower than the predetermined value.

Furthermore, a storage medium according to the present invention is characterized by the following configuration according to its first aspect.

According to the present invention, the foregoing object is attained by providing a storage medium readable by a computer, the medium storing a program realizing: an extraction step of receiving object light through a focus lens that performs focus adjustment and extracting a signal indicative of a focus level; a first focus operation step of performing focus operation by moving the focus lens while determining a focus level based on the signal extracted in the extraction step, and when it is determined that the focus lens has passed a position where the focus level becomes maximum, returning and stopping the focus lens at the position where the focus level becomes maximum; a second focus operation step of performing focus operation by storing signals extracted in the extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of the second focus operation step in a case where the second focus operation step is executed after completing the focus operation of the first focus operation step, or setting a second range as the predetermined range of the second focus operation step in a case where the second focus operation step is executed before completing the focus operation of the first focus operation step.

Furthermore, a storage medium according to the present invention is characterized by the following configuration according to its second aspect.

According to the present invention, a storage medium readable by a computer, the medium storing a program realizing: an extraction step of receiving object light through a focus lens that performs focus adjustment and extracting a signal indicative of a focus level; a first focus operation step of performing focus operation by moving the focus lens while determining a focus level based on the signal extracted in the extraction step, and when it is determined that the focus lens has passed a position where the focus level becomes maximum, returning and stopping the focus lens at the position where the focus level becomes maximum; a second focus operation step of performing focus operation by storing signals extracted in the extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of the second focus operation step in a case where the focus level obtained in the first focus operation step is higher than a predetermined value, or setting a second range as the predetermined range of the second focus operation step in a case where the focus level obtained in the first focus operation step is equal to or lower than the predetermined value.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<First Embodiment>

Figure 1:
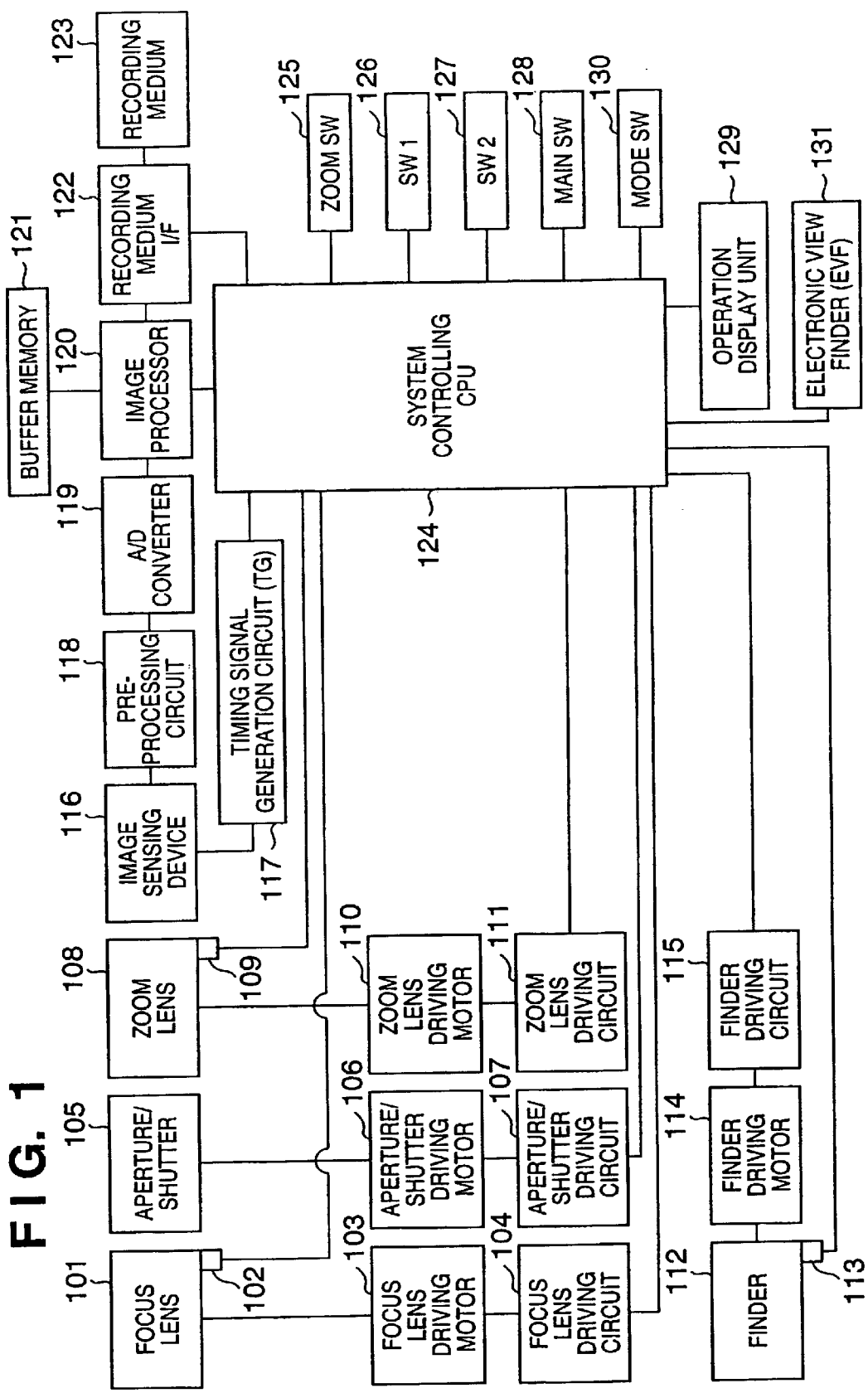
FIG. 1 is a block diagram showing a configuration of an electronic camera according to the first embodiment of the present invention.

FIG. 1 is a block diagram showing a configuration of an electronic camera according to the first embodiment of the present invention.

Reference numeral 101 denotes a focus lens for obtaining a focus on an image sensing device which will be described later; 102, a photo interrupter for detecting an initial position of the focus lens 101; 103, a focus lens driving motor which drives the focus lens 101; and 104, a focus lens driving circuit which drives the focus lens 101 by inputting a driving signal to the focus lens driving motor 103.

Reference numeral 105 denotes an aperture/shutter for adjusting the amount of incident light; 106, an aperture/shutter driving motor which drives the aperture/shutter 105; and 107, an aperture/shutter driving circuit which drives the aperture/shutter 105 by inputting a driving signal to the aperture/shutter driving motor 106.

Reference numeral 108 denotes a zoom lens for changing a focus distance of an image sensing lens; 109, a photo interrupter for detecting an initial position of the zoom lens 108; 110, a zoom lens driving motor which drives the zoom lens 108; and 111, a zoom lens driving circuit which drives the zoom lens 108 by inputting a driving signal to the zoom lens driving motor 110.

Reference numeral 112 denotes an optical zoom finder; 113, a photo interrupter for detecting an initial position of the finder 112; 114, a finder driving motor which drives the finder 112; and 115, a finder driving circuit which drives the finder 112 by inputting a driving signal to the finder driving motor 114.

Reference numeral 116 denotes an image sensing device which converts light reflected on an object into an electric signal; 117, a timing signal generation circuit (hereinafter referred to as TG) which generates a timing signal necessary to drive the image sensing device 116; 118, a pre-processing circuit comprising a CDS circuit for removing output noise of the image sensing device 116 and an amplifying circuit for performing nonlinear amplification before A/D conversion; 119, an A/D converter; 120, an image processor performing a predetermined processing on image data inputted by the A/D converter 119; 121, buffer memory; 122, a recording medium interface for connecting with a recording medium which will be described later; and 123, a recording medium such as a memory card, hard disk or the like.

Reference numeral 124 denotes a system controlling micro-controller (hereinafter referred to as CPU) for executing an image sensing sequence or the like; 125, a zoom switch (SW) for inputting signals indicative of zoom operation start or stop to the CPU 124; 126, a switch (hereinafter referred to as SW(1)) for performing image-sensing preparation operation, e.g., AF (automatic focus adjustment) or AE (automatic exposure adjustment), by first-level depression of a shutter release operation member (not shown); 127, a switch (hereinafter referred to as SW(2)) for executing image sensing operation by second-level depression of the shutter release operation member after the operation of the SW(1) 126; 128, a main switch (SW) for turning on power of the system; 129, an operation display unit for displaying an operation state of the camera and various warnings; 130, a mode switch (SW) for setting an operation mode of the camera; and 131, an electronic view finder (hereinafter referred to as EVF) which displays an image.

Next, operation of an electronic camera is described with reference to FIG. 2.

Figure 2:
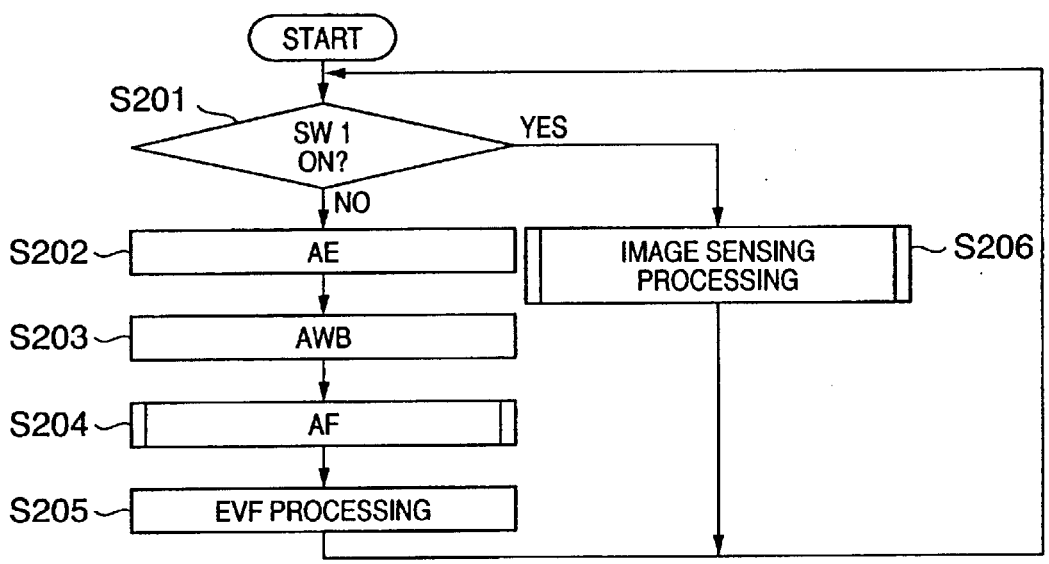
FIG. 2 is a flowchart showing steps of basic processing executed by an electronic camera.

FIG. 2 is a flowchart showing steps of basic processing executed by an electronic camera. This processing is executed at every elapse of predetermined period.

First, in step S201, the state of the SW(1) 126 for image-sensing preparation is determined. If it is ON, the control proceeds to step S206 to perform image sensing processing which will be described later. If it is not ON, the control proceeds to step S202.

In step S202, the aperture value and shutter speed of the aperture/shutter 105 are controlled and AE operation is performed to achieve appropriate brightness of an image displayed on the EVF 131.

In step S203, automatic white balance (AWB) operation is performed to achieve an appropriate color balance of an image, displayed on the EVF 131, without being influenced by a color temperature of a light source.

In step S204, AF operation is performed in accordance with the steps which will be described later.

In step S205, predetermined processing is performed on an image signal read out of the image sensing device 116, and the EVF 131 performs displaying.

Figure 3:
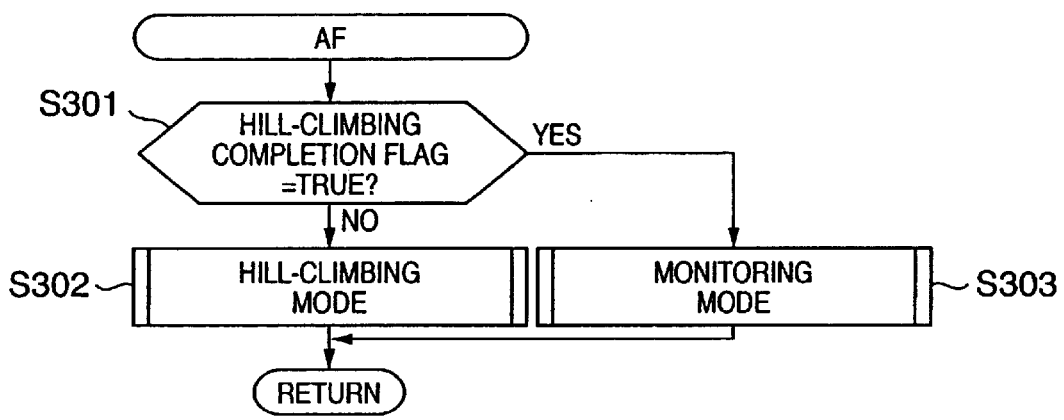
FIG. 3 is a flowchart showing detailed steps of AF (automatic focus) operation executed in step S204 of FIG. 2.

FIG. 3 is a flowchart showing detailed steps of AF operation executed in step S204 of FIG. 2.

First, in step S301, it is determined whether or not a hill-climbing completing flag is TRUE. If it is TRUE, the control proceeds to step S303. If not, the control proceeds to step S302. Assume that the hill-climbing completion flag is set in FALSE in advance by an initialization operation (not shown).

In step S302, AF operation is performed in the hill-climbing mode which will be described later. In step S303, AF operation is performed in the monitoring mode which will be described later.

Figure 4:
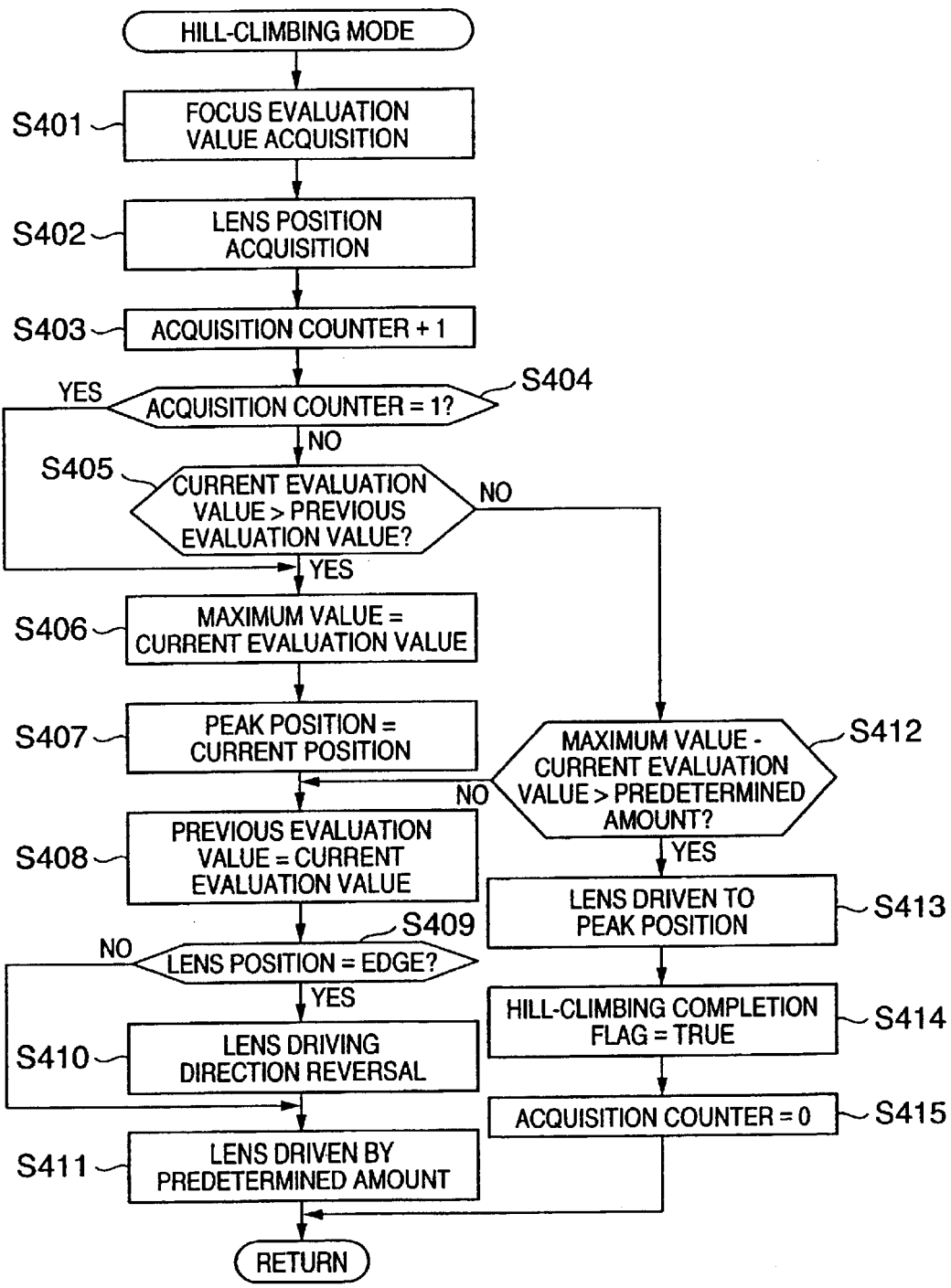
FIG. 4 is a flowchart showing detailed steps of AF operation in the hill-climbing mode executed in step S302 of FIG. 3.

FIG. 4 is a flowchart showing detailed steps of AF operation in the hill-climbing mode executed in step S302 of FIG. 3. In this AF operation, a focus evaluation value is detected based on luminance signals across the whole image sensing frame, and while the focus lens 101 is driven by a predetermined amount in the direction that the focus evaluation value increases, a lens position having the maximum focus evaluation value is detected.

Figure 12:
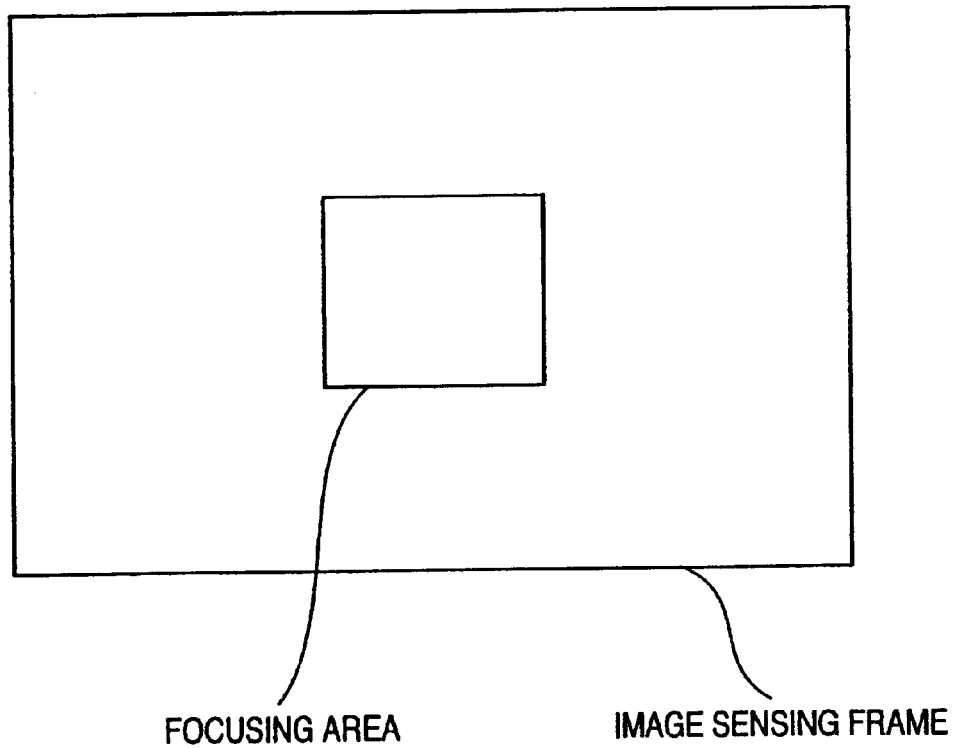
FIG. 12 is a view showing a focusing area of an image sensing frame.
Figure 13:
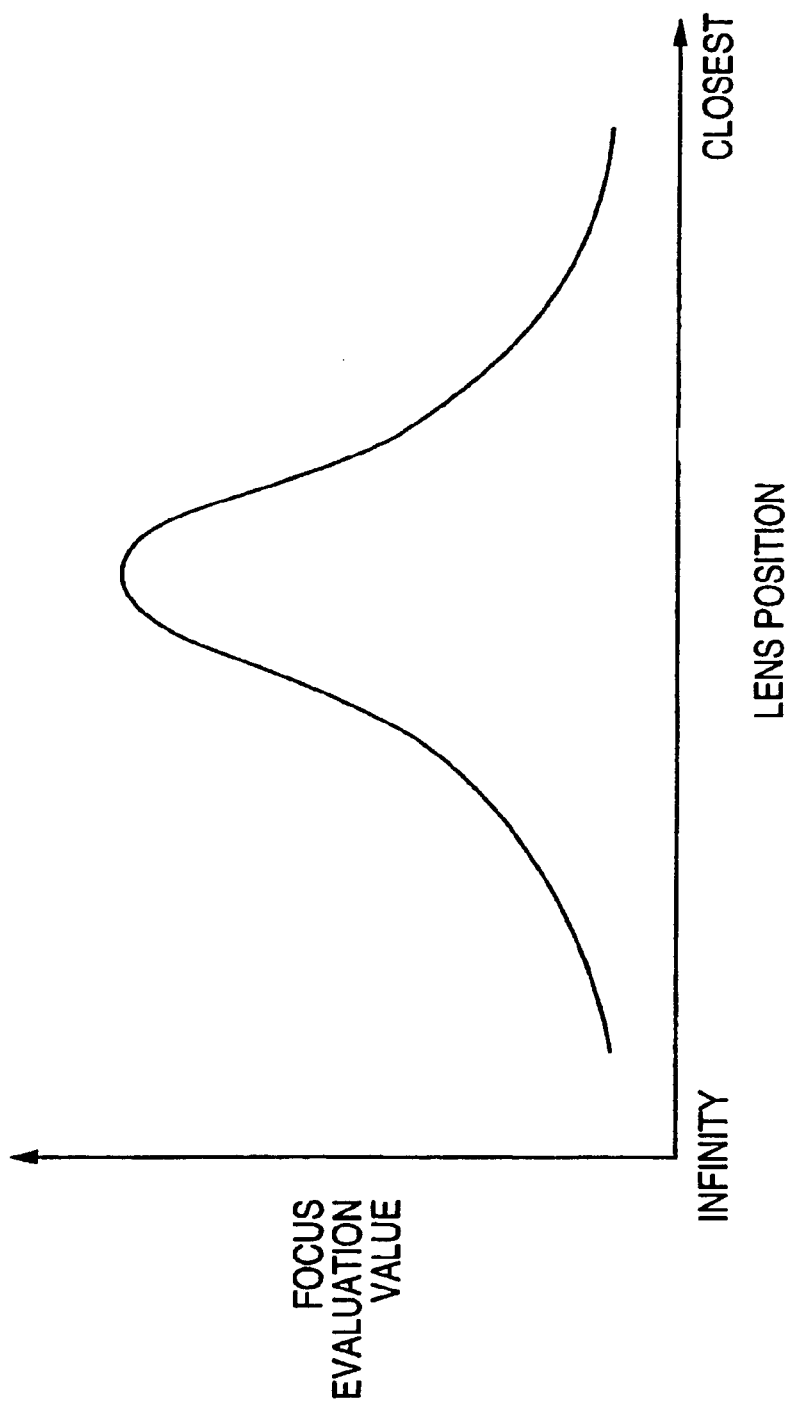
FIG. 13 is a graph showing a relation between lens positions and focus evaluation values in a predetermined focusing area.

First, in step S401, a focus evaluation value, which is a level of a high-frequency-range component, consisting only of the high-frequency-range luminance signals among the luminance signals for a predetermined area of all pixels obtained from the image sensing device 116, is acquired when the focus lens 101 is at the current position. Herein, the predetermined area is the central area of the entire frame shown in FIG. 12.

In step S402, the current position of the focus lens 101 is acquired.

In step S403, an acquisition counter is incremented by 1. Assume that the acquisition counter is set in 0 in advance by an initialization operation (not shown).

In step S404, it is determined whether or not the acquisition counter value is 1. If YES, the control proceeds to step S406. If NO, the control proceeds to step S405.

In step S405, it is determined whether or not the currently detected focus evaluation value at the current position of the focus lens 101 is higher than the previously detected focus evaluation value at the previous position of the focus lens 101. If YES, the control proceeds to step S406. If NO, the control proceeds to step S412.

In step S406, the current focus evaluation value is stored as the maximum value of the focus evaluation value.

In step S407, the current position of the focus lens 101 is stored as a position of the focus lens 101 having the maximum focus evaluation value, i.e., a peak position.

In step S408, the current focus evaluation value is stored as a previous focus evaluation value.

In step S409, it is determined whether or not the current position of the focus lens 101 is at the edge of a drivable range. If YES, the control proceeds to step S410. If NO, the control proceeds to step S411.

In step S410, the driving direction of the focus lens 101 is reversed.

In step S411, the focus lens 101 is driven by a predetermined amount.

In step S412, it is determined whether or not (the maximum value of the focus evaluation value—the current evaluation value) is larger than a predetermined amount. If YES, it can be regarded that the current evaluation value has decreased from the maximum value by an amount exceeding the predetermined amount, and that the focus lens 101 has certainly passed the peak position. Thus, the already obtained maximum value is recognized as a focus evaluation value at the peak position, and the control proceeds to step S413. Meanwhile, in a case where it is determined that (the maximum value of the focus evaluation value—the current evaluation value) is equal to or smaller than the predetermined amount, it cannot be regarded that the focus lens 101 has certainly passed the peak position. There is a possibility that the current focus evaluation value is equal to or lower than the previous focus evaluation value because of other factors. Therefore, to further change the position of the focus lens 101, the control proceeds to step S408.

In step S413, the focus lens 101 is driven to the peak position stored in step S407.

In step S414, the hill-climbing completion flag is set in TRUE.

In step S415, the acquisition counter is set in 0.

Figure 5:
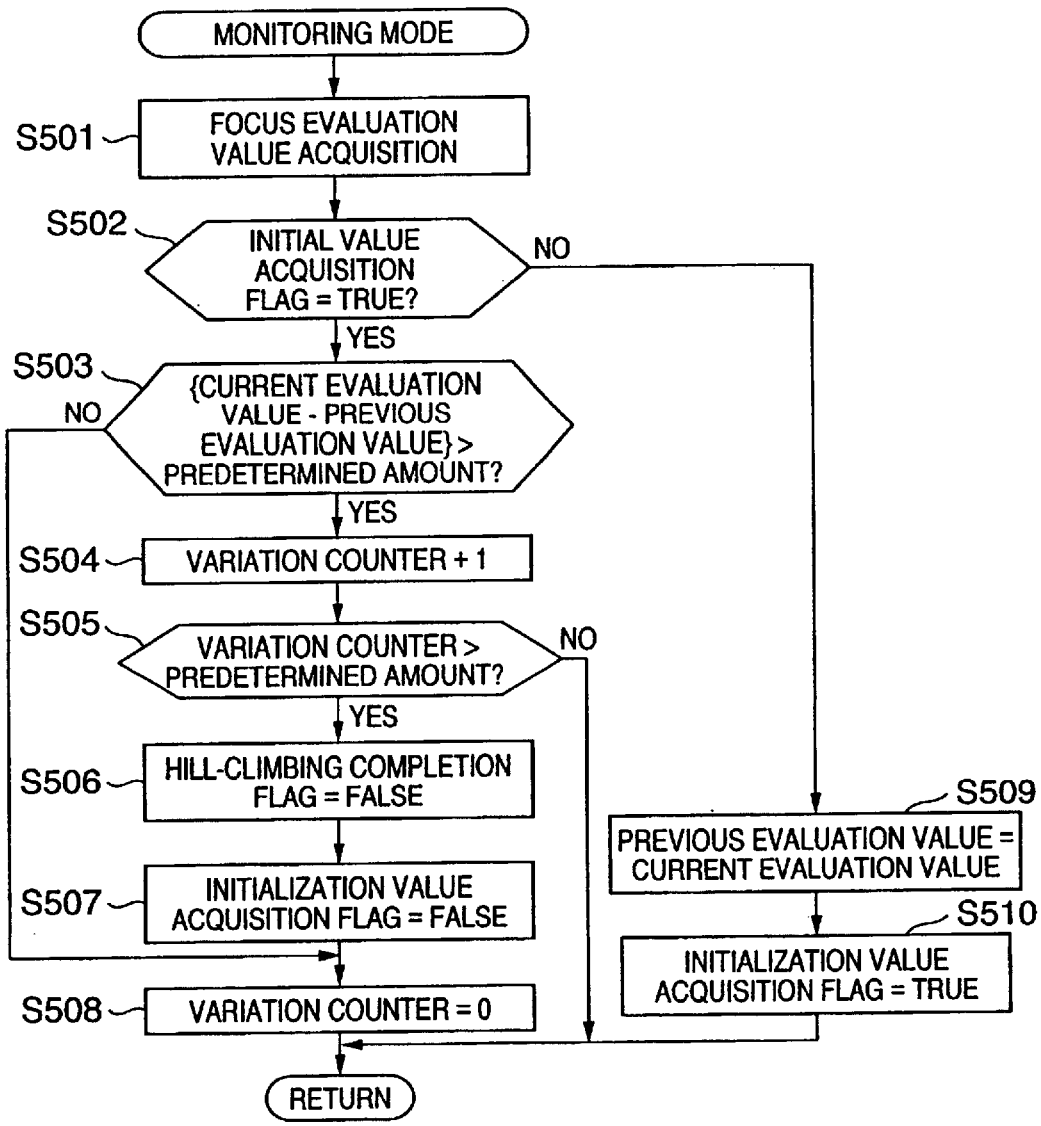
FIG. 5 is a flowchart showing detailed steps of AF operation in a monitoring mode executed in step S303 of FIG. 3.

FIG. 5 is a flowchart showing detailed steps of AF operation in the monitoring mode executed in step S303 of FIG. 3. In this AF operation, a focus evaluation value is acquired at every predetermined period while the focus lens 101 is fixed at the lens position which is designated as the peak position in the AF operation in the hill-climbing mode in FIG. 4, and when the acquired focus evaluation value changes by an amount larger than a predetermined amount, the AF operation in the hill-climbing mode is resumed. Note since the AF operation in the monitoring mode is executed along with the basic processing shown in FIG. 2 which is executed at every predetermined period, this AF operation in the monitoring mode is also executed at every predetermined period.

First, in step S501, a current focus evaluation value is acquired while the focus lens 101 is fixed at the lens position designated as the peak position.

Next, in step S502, it is determined whether or not an initial value acquisition flag is TRUE. If YES, the control proceeds to step S503. If NO, the control proceeds to step S509. Assume that the initial value acquisition flag is set in FALSE in advance by an initialization operation (not shown).

In step S503, it is determined whether or not an absolute value of the difference between the current focus evaluation value and previous focus evaluation value is larger than a predetermined amount. If YES, the control proceeds to step S504. If NO, the control proceeds to step S508.

In step S504, a variation counter is incremented by 1. Assume that the variation counter is set in 0 in advance by an initialization operation (not shown).

In step S505, it is determined whether or not the counted value of the variation counter is higher than a predetermined value. If YES, the control proceeds to step S506. If NO, the current processing ends, and the next processing of the monitoring mode is prepared.

In step S506, the hill-climbing completion flag is set in FALSE. More specifically, since the focus evaluation value has changed by an amount larger than a predetermined amount within a predetermined period and such change has occurred a predetermined number of times, it is considered that the peak position previously obtained by the AF operation in the hill-climbing mode is no longer reliable. Therefore, to resume AF operation in the hill-climbing mode, the hill-climbing completion flag is set in FALSE.

In step S507, the initialization value acquisition flag is set in FALSE.

In step S508, the variation counter is set in 0.

In step S509, the current focus evaluation value is stored as a previous focus evaluation value.

In step S510, the initialization value acquisition flag is set in TRUE.

Figure 6:
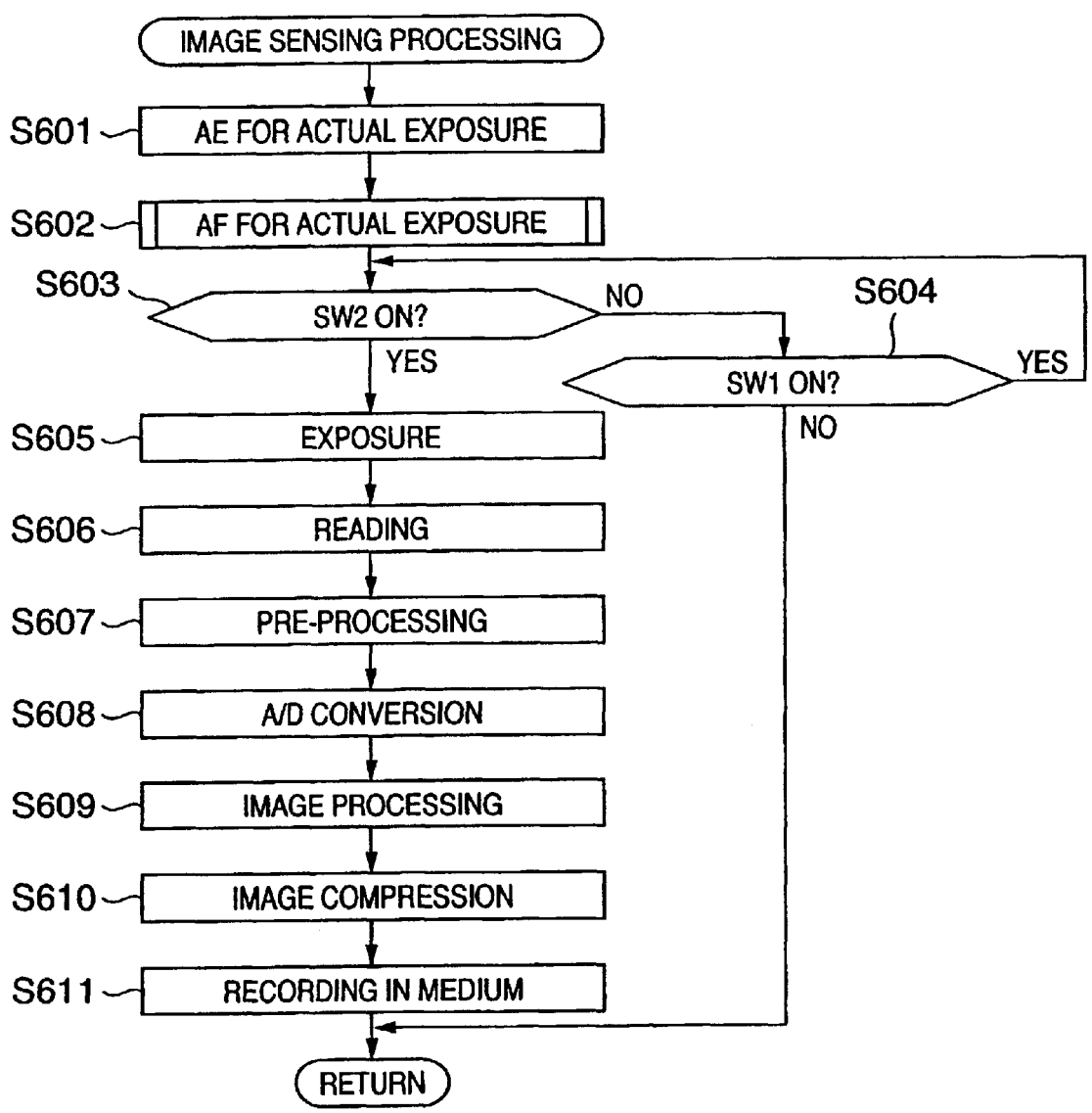
FIG. 6 is a flowchart showing detailed steps of image-sensing processing in step S206 of FIG. 2.

FIG. 6 is a flowchart showing detailed steps of image sensing processing in step S206 of FIG. 2. As described above, this processing is executed when the SW(1) 126 for image-sensing preparation is ON.

In step S601, AE operation for actual exposure is performed.

In step S602, AF operation for actual exposure is performed in accordance with the steps which will be described later.

In step S603, it is determined whether or not the SW(2) 127 for image sensing is ON. If YES, the control proceeds to step S605. If NO, the control proceeds to step S604.

In step S604, the state of the SW(1) 126 for image-sensing preparation is determined. If it is ON, the control returns to step S603; otherwise, the image sensing processing ends.

In step S605, the aperture/shutter 105 is driven to perform exposure for the image sensing device 116.

In step S606, image data stored in the image sensing device 116 is read.

In step S607, the pre-processing circuit 118 removes output noise of the image sensing device 116 out of the read image data, and performs nonlinear processing before A/D conversion.

In step S608, the A/D converter 119 converts an analog signal, outputted by the pre-processing circuit 118, to a digital signal.

In step S609, the image processor 120 performs various image processing, including gamma conversion processing and color conversion processing, on the digital signal outputted by the A/D converter 119.

In step S610, the image processor 120 further performs compression on the image data, which has been processed in step S609, in accordance with the format such as JPEG.

In step S611, the image data compressed in step S610 is transferred to the recording medium 123, such as a memory card inserted in the camera body, through the recording medium interface 122.

Figure 7:
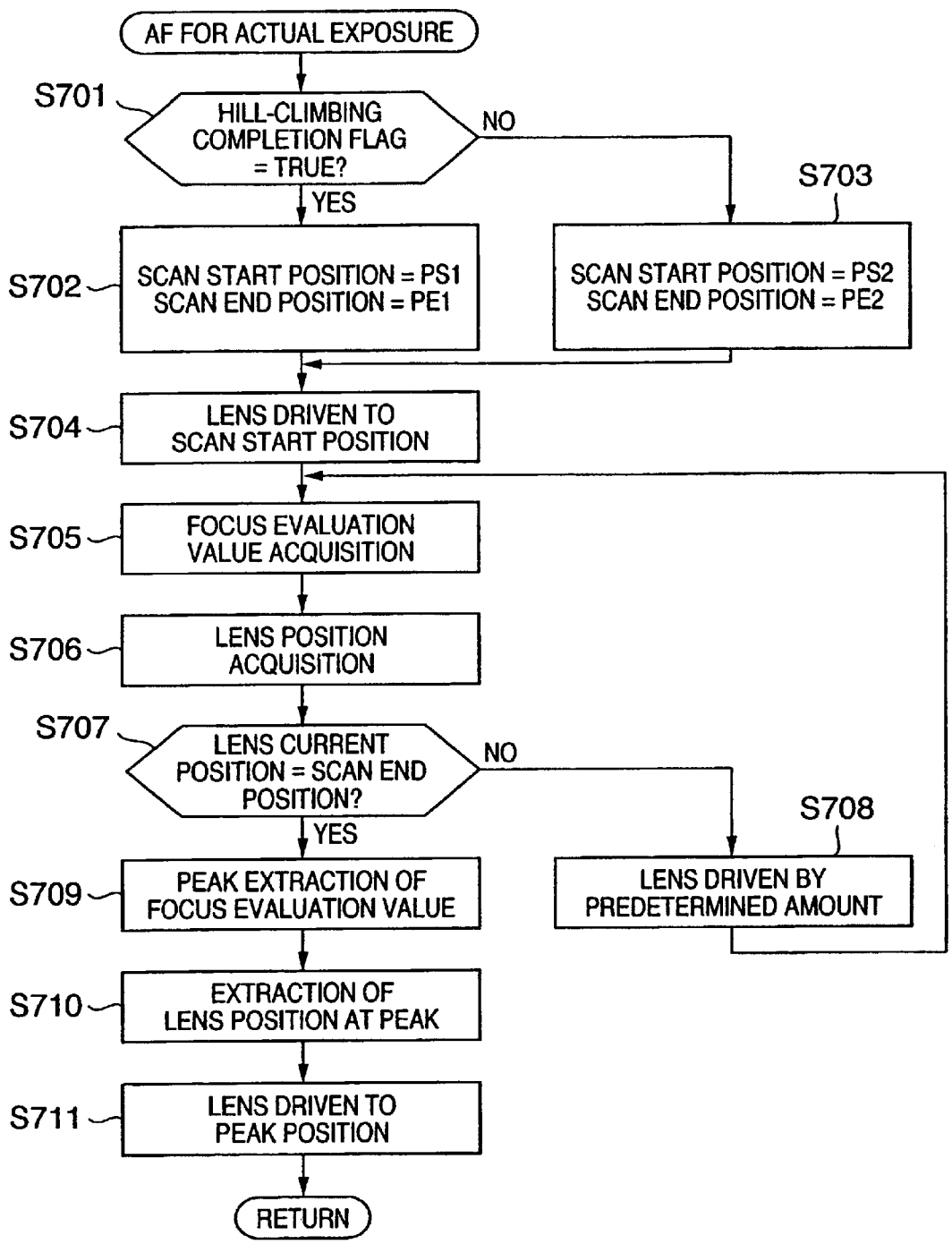
FIG. 7 is a flowchart showing detailed steps of AF operation for actual exposure in step S602 of FIG. 6.

FIG. 7 is a flowchart showing detailed steps of AF operation for actual exposure in step S602 of FIG. 6. In the AF operation for actual exposure, the focus lens 101 is driven (scanned) in the neighborhood of the peak position, and a focus evaluation value is acquired.

First, in step S701, it is determined whether or not the hill-climbing completion flag is TRUE. If YES, the control proceeds to step S702. If NO, the control proceeds to step S703. The hill-climbing completion flag is set in step S414 of FIG. 4 or step S507 of FIG. 5.

Next, in step S702, a scan start position of the focus lens 101 is set in PS1, and a scan end position is set in PE1.

In step S703, the scan start position is set in PS2, and the scan end position is set in PE2.

Each of these positions PS1, PE1, PS2, and PE2 will be described later.

In step S704, the focus lens 101 is driven to the scan start position set in step S702 or S703.

In step S705, a focus evaluation value is acquired at the current position of the focus lens 101.

In step S706, the current position of the focus lens 101 is acquired.

In step S707, it is determined whether or not the current position of the focus lens 101 acquired in step S706 is the same position as the scan end position set in step S702 or S703. If YES, the control proceeds to step S709. If NO, the control returns to step S708.

In step S708, the focus lens 101 is driven by a predetermined amount toward the scan end position.

In step S709, the maximum focus evaluation value (peak) is extracted from respective focus evaluation values, obtained each time step S705 is executed at each position of the focus lens 101 along with the driving of the focus lens 101.

In step S710, the position of the focus lens 101 corresponding to the maximum focus evaluation value (peak) extracted in step S709, i.e., peak position, is extracted from respective positions of the focus lens 101, obtained each time step S706 is executed along with the driving of the focus lens 101.

In step S711, the focus lens 101 is driven to the peak position extracted in step S710.

Figure 8:
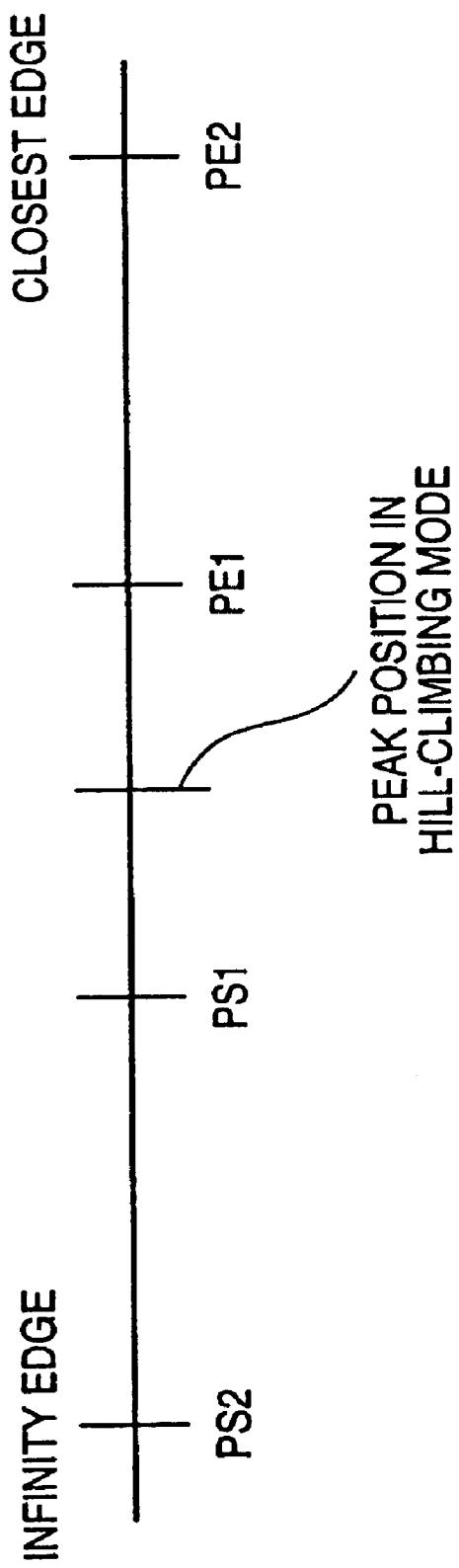
FIG. 8 is a view showing positional relations between positions PS1 and PE1 as well as positions PS2 and PE2 in steps S702 and S703 of FIG. 7.

FIG. 8 is a view showing positional relations between the positions PS1 and PE1 as well as positions PS2 and PE2 in steps S702 and S703 of FIG. 7.

More specifically, the position PS2 is set on an infinity edge and position PE2 is set on a closest edge of the drivable range of the focus lens 101. Meanwhile, the positions PS1 and PE1 are set such that the driving range from the position PS1 to PE1 is narrower than the driving range from the position PS2 to PE2.

Therefore, in a case where the AF operation in the hill-climbing mode described in FIG. 4 is completed and the hill-climbing completion flag is set in TRUE, the focus lens 101 is scanned in the narrow driving range, but in a case where the AF operation is not completed, the focus lens 101 is scanned in the wide driving range.

Furthermore, the positions PS1 and PE1 are respectively set at positions that are away from each other in the opposite direction from the peak position serving as the center, by a predetermined amount. The peak position is where the focus lens 101 is driven to in step S413 in FIG. 4. By setting these positions in this manner, the focus lens 101 is driven in the range that is the vicinity of the focus position (peak position) serving as the center, which is acquired in the AF operation in the hill-climbing mode. Therefore, AF operation at the time of actual exposure is realized by only slight adjustment of the focus lens 101 in the vicinity of the focus position (peak position). Accordingly, focus processing time can be reduced.

On the contrary, if the SW(2) 127 for image sensing is turned ON in a case where the AF operation in the hill-climbing mode is not completed and the hill-climbing completion flag is not set in TRUE, it is impossible to scan the focus lens 101 in the range that is the vicinity of the focus position (peak position) serving as the center, as described above. Therefore, to scan the focus lens 101 in all area of the drivable range, the scan start position PS2 is set on the infinity edge and the scan end position PE2 is set on the closest edge. By setting these positions in this manner, in a case where the SW(2) 127 for image sensing is turned ON despite the fact that the peak position is not yet detected by AF operation in the hill-climbing mode, it is possible to achieve accurate focusing.

<Second Embodiment>

In the first embodiment, the driving (scanning) range of the focus lens 101 in the AF operation for actual exposure is changed in accordance with whether or not AF operation in the hill-climbing mode is completed and the hill-climbing completion flag is set in TRUE. Instead, according to the second embodiment, even if AF operation in the hill-climbing mode is completed and the hill-climbing completion flag is set in TRUE, the scanning range is changed in accordance with a focus state.

The configuration of the second embodiment is basically the same as the configuration of the first embodiment. Therefore, in the description of the second embodiment, the construction of the first embodiment is used, and only the part different from the first embodiment is described.

Figure 9:
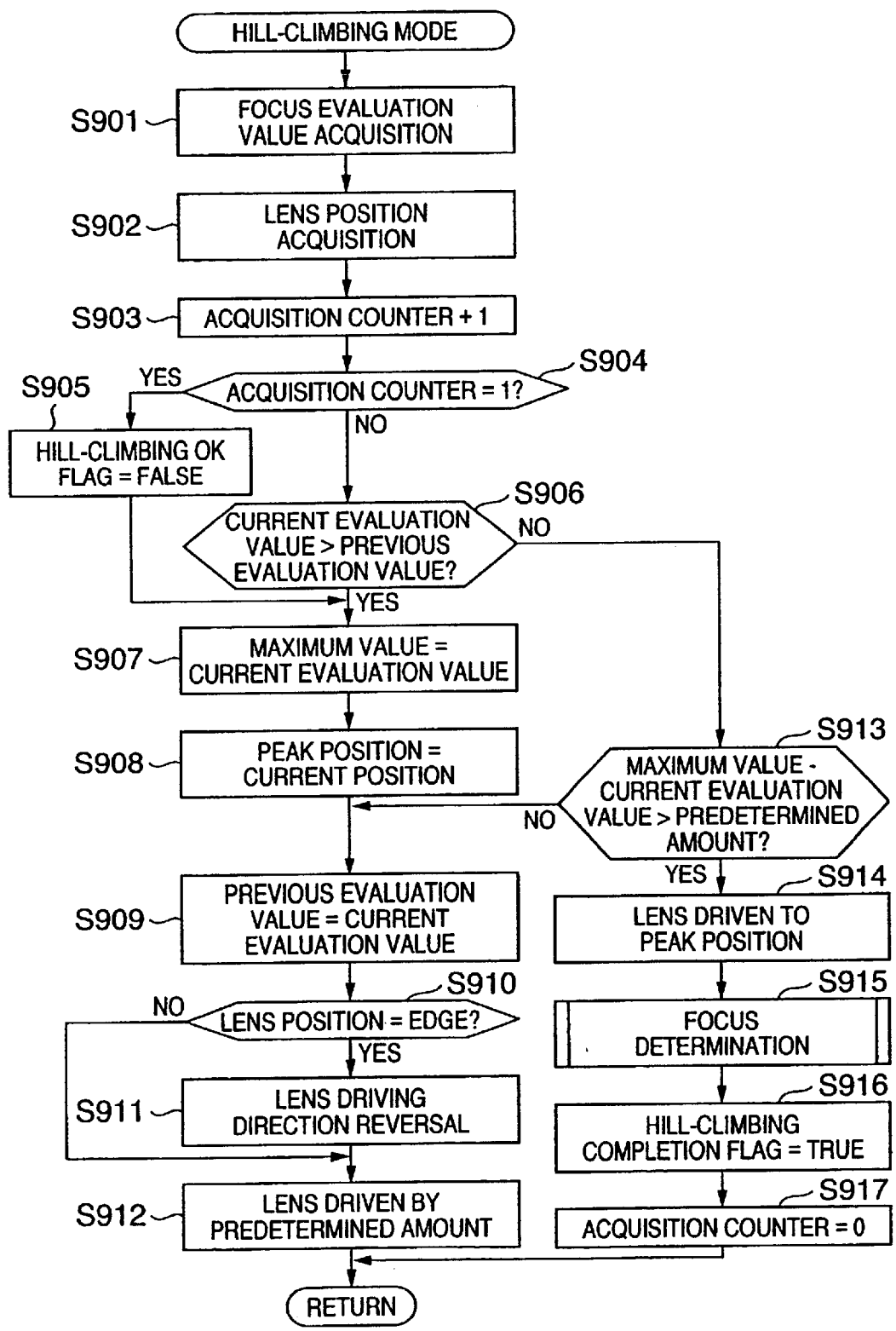
FIG. 9 is a flowchart showing detailed steps of AF operation in the hill-climbing mode according to the second embodiment of the present invention, which is executed in step S302 of FIG. 3.

FIG. 9 is a flowchart showing detailed steps of AF operation in the hill-climbing mode according to the second embodiment, which is executed in step S302 of FIG. 3. These steps are to replace the steps according to the first embodiment shown in FIG. 4.

First, in step S901, a focus evaluation value is acquired when the focus lens 101 is at the current position.

In step S902, the current position of the focus lens 101 is acquired.

In step S903, an acquisition counter is incremented by 1. Assume that the acquisition counter is set in 0 in advance by an initialization operation (not shown).

In step S904, it is determined whether or not the acquisition counter value is 1. If YES, the control proceeds to step S905. If NO, the control proceeds to step S906.

In step S905, a hill-climbing OK flag, used in focus determination which will be described later, is set in FALSE.

Assume that the hill-climbing OK flag is set in FALSE in advance by an initialization operation (not shown).

In step S906, it is determined whether or not the currently detected focus evaluation value at the current position of the focus lens 101 is higher than the previously detected focus evaluation value at the previous position of the focus lens 101. If YES, the control proceeds to step S907. If NO, the control proceeds to step S913.

In step S907, the current focus evaluation value is stored as the maximum value of the focus evaluation value.

In step S908, the current position of the focus lens 101 is stored as a position of the focus lens 101 having the maximum focus evaluation value, i.e., a peak position.

In step S909, the current focus evaluation value is stored as a previous focus evaluation value.

In step S910, it is determined whether or not the current position of the focus lens 101 is at the edge of a drivable range. If YES, the control proceeds to step S911. If NO, the control proceeds to step S912.

In step S911, the driving direction of the focus lens 101 is reversed.

In step S912, the focus lens 101 is driven by a predetermined amount.

In step S913, it is determined whether or not (the maximum value of the focus evaluation value—the current evaluation value) is larger than a predetermined amount. If YES, it can be regarded that the focus lens 101 has certainly passed the peak position. Thus, the already obtained maximum value is recognized as a focus evaluation value at the peak position, and the control proceeds to step S914. Meanwhile, in a case where it is determined that (the maximum value of the focus evaluation value—the current evaluation value) is equal to or smaller than the predetermined amount, it cannot be regarded that the focus lens 101 has certainly passed the peak position. Therefore, to further change the position of the focus lens 101, the control proceeds to step S909.

In step S914, the focus lens 101 is driven to the peak position stored in step S908.

In step S915, focus determination is performed in accordance with the steps which will be described later.

In step S916, the hill-climbing completion flag is set in TRUE.

In step S917, the acquisition counter is set in 0.

Figure 10:
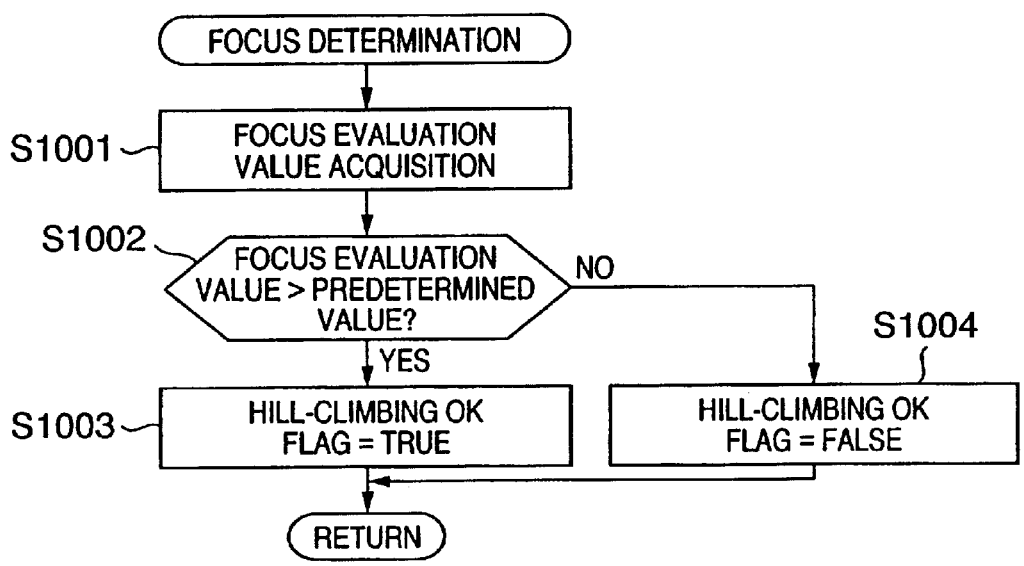
FIG. 10 is a flowchart showing detailed steps of focus determination processing executed in step S915 of FIG. 9.

FIG. 10 is a flowchart showing detailed steps of focus determination processing executed in step S915 of FIG. 9.

First, in step S1001, a focus evaluation value at the current position of the focus lens 101 is acquired. Note in step S914 in FIG. 9, since the focus lens 101 has been moved to the peak position stored in step S908, the focus evaluation value acquired herein is a value at the peak position obtained as a result of AF operation in the hill-climbing mode.

In step S1002, it is determined whether or not the focus evaluation value acquired in step S1001 is higher than a predetermined value. If YES, the control proceeds to step S1003. If NO, the control proceeds to step S1004.

In step S1003, the hill-climbing OK flag is set in TRUE.

In step S1004, the hill-climbing OK flag is set in FALSE.

In other words, when the focus evaluation value at the peak position is higher than a predetermined value, the peak position is highly likely the focused position, and if this is not the case, the peak position is not likely the focused position.

Figure 11:
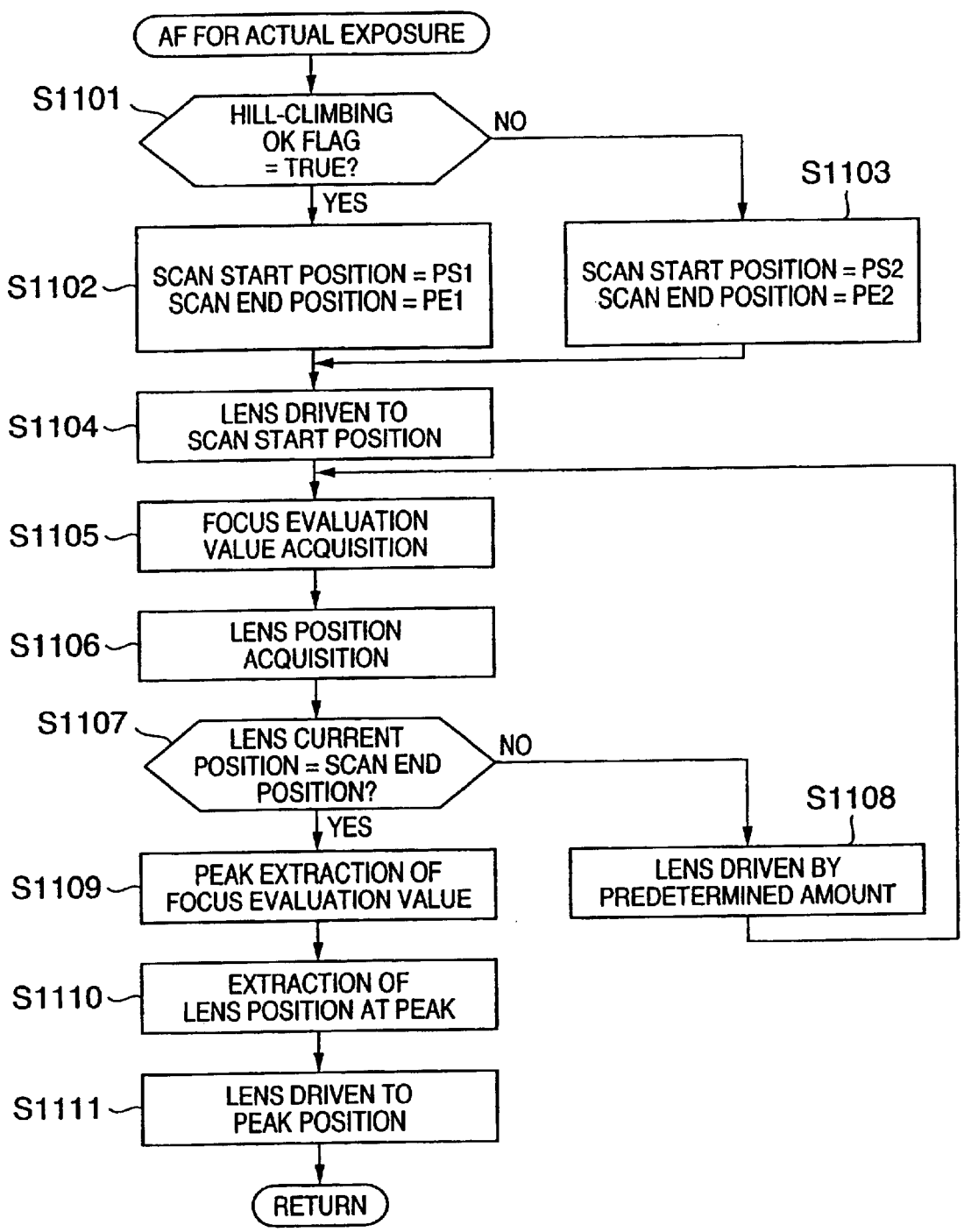
FIG. 11 is a flowchart showing detailed steps of AF operation for actual exposure according to the second embodiment of the present invention, which is executed in step S602 of FIG. 6.

FIG. 11 is a flowchart showing detailed steps of AF operation for actual exposure according to the second embodiment, which is executed in step S602 of FIG. 6. These steps are to replace the steps according to the first embodiment shown in FIG. 7.

First, in step S1101, it is determined whether or not the hill-climbing OK flag is TRUE. If YES, the control proceeds to step S1102. If NO, the control proceeds to step S1103. The hill-climbing OK flag is set in step S1003 or S1004 of FIG. 10.

Next, in step S1102, the scan start position of the focus lens 101 is set in PS1, and the scan end position is set in PE1.

In step S1103, the scan start position is set in PS2, and the scan end position is set in PE2.

The way of setting each of these positions PS1, PE1, PS2, and PE2 is the same as that in step S702 or S703 of FIG. 7, which is described in the first embodiment.

Processing in steps S1104 to S1111 is the same as the processing in steps S704 to S711 in FIG. 7 described in the first embodiment. Therefore, detailed description thereof is omitted.

With respect to the positional relations between the positions PS1 and PE1 as well as positions PS2 and PE2, the position PS2 is set on an infinity edge and position PE2 is set on a closest edge of the drivable range of the focus lens 101, as similar to the positional relations described in the first embodiment shown in FIG. 8. Meanwhile, the positions PS1 and PE1 are set such that the driving range from the position PS1 to PE1 is narrower than the driving range from the position PS2 to PE2.

Therefore, as described with reference to FIG. 10, in a case where the focus evaluation value at the peak position is higher than a predetermined value and the hill-climbing OK flag is set in TRUE, thus there is a high possibility of being focused, the focus lens 101 is scanned in the narrow driving range, but in a case where the focus evaluation value at the peak position is equal to or lower than the predetermined value and the hill-climbing OK flag is set in FALSE, thus there is a low possibility of being focused, the focus lens 101 is scanned in the wide driving range.

Furthermore, the positions PS1 and PE1 are respectively set at positions that are away from each other in the opposite direction from the peak position serving as the center, by a predetermined amount. The peak position is where the focus lens 101 is driven to in step S914 in FIG. 9. By setting these positions in this manner, the focus lens 101 is driven in the range that is the vicinity of the focus position (peak position) serving as the center, which is acquired in the AF operation in the hill-climbing mode. Therefore, if the peak position obtained by the AF operation in the hill-climbing mode is highly likely the focused position, AF operation at the time of actual exposure is realized by only slight adjustment of the focus lens 101 in the vicinity of the focus position (peak position). Accordingly, focus processing time can be reduced.

On the contrary, if the peak position obtained by the AF operation in the hill-climbing mode is not likely the focused position, the scan start position PS2 is set on the infinity edge and the scan end position PE2 is set on the closest edge to scan the focus lens 101 in all area of the drivable range. By setting these positions in this manner, even in a case where the peak position obtained by the AF operation in the hill-climbing mode is not likely the focused position, it is possible to achieve accurate focusing.

<Other Embodiment>

Note that the present invention may be constructed with program codes of software, which realize the functions according to each of the above-described embodiments, or a storage medium storing the program codes.

In this case, the program codes read out of the storage medium realize the functions according to each of the above-described embodiments, and the storage medium storing the program codes constitutes the invention.

The storage medium, such as a floppy® disk, hard disk, an optical disk, a magneto-optical disk, CD-ROM, CD-R, a magnetic tape, a non-volatile type memory card, and ROM can be used for providing the program codes.

Furthermore, besides aforesaid functions according to each of the above-described embodiments are realized by executing the program codes which are read by a computer, the present invention includes a case where an OS (operating system) or the like working on the computer performs a part or the entire processes in accordance with designations of the program codes and realizes functions according to each of the above-described embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes functions according to each of the above-described embodiments.

As has been described above, according to the above-described embodiments, the driving range of a focus lens at the time of actual exposure is changed in accordance with whether or not AF operation in the hill-climbing mode has been completed and a peak position has been detected.

By virtue of this, in a case where a focus position is not yet obtained by the hill-climbing focusing method, it is possible to achieve accurate focusing. In addition, even in a case where a focus position has already been obtained by the hill-climbing focusing method, it is possible to achieve focusing in a short time.

Furthermore, according to the above-described embodiments, a focus evaluation value is compared with a predetermined value, and the driving range of the focus lens at the time of actual exposure is changed in accordance with the comparison result.

By virtue of this, in a case where a focus position has correctly been obtained by the hill-climbing focusing method, it is possible to make slight adjustment of the focus in a short time. Even in a case where a focus position is not correctly obtained by the hill-climbing focusing method, it is possible to achieve focusing by driving (scanning) a focus lens in an all area of the driving range.

The present invention is not limited to the above embodiment and various changes and modifications can be made within the spirit and scope of the present invention. Therefore, to apprise the public of the scope of the present invention, the following claims are made.

What is claimed is:

1. A focus adjusting apparatus comprising:
   an extraction unit adapted to receive object light through a focus lens that performs focus adjustment, and extract a signal indicative of a focus level;
   a first focus operation mode adapted to perform focus operation by moving the focus lens while determining a focus level based on the signal extracted by said extraction unit, and when it is determined that the focus lens has passed a position where the focus level becomes maximum, returning and stopping the focus lens at the position where the focus level becomes maximum;
   a second focus operation mode adapted to perform focus operation by storing signals extracted by said extraction unit at each of a plurality of positions of the focus lens while moving the focus lens across a predetermined range in response to an operation of a shutter release operation member, and moving the focus lens to a position where the focus level becomes maximum in the stored signals; and
   a control unit adapted to set a first range as the predetermined range of said second focus operation mode in a case where said second focus operation mode is executed after completing the focus operation of said first focus operation mode, or set a second range as the predetermined range of said second focus operation mode in a case where said second focus operation mode is executed before completing the focus operation of said first focus operation mode.

2. The focus adjusting apparatus according to claim 1, wherein said first range is narrower than said second range.

3. The focus adjusting apparatus according to claim 1, wherein said first range includes the position where the focus level becomes maximum in said first focus operation mode.

4. The focus adjusting apparatus according to claim 1, wherein the signal indicative of the focus level is a signal that indicates a high-frequency-component state of the object light.

5. An image sensing apparatus comprising a focus adjusting apparatus which includes:
   an extraction unit adapted to receive object light through a focus lens that performs focus adjustment, and extract a signal indicative of a focus level;
   a first focus operation mode adapted to perform focus operation by moving the focus lens while determining a focus level based on the signal extracted by said extraction unit, and when it is determined that the focus lens has passed a position where the focus level becomes maximum, returning and stopping the focus lens at the position where the focus level becomes maximum;
   a second focus operation mode adapted to perform focus operation by storing signals extracted by said extraction unit at each of a plurality of positions of the focus lens while moving the focus lens across a predetermined range in response to an operation of a shutter release operation member, and moving the focus lens to a position where the focus level becomes maximum in the stored signals; and
   a control unit adapted to set a first range as the predetermined range of said second focus operation mode in a case where said second focus operation mode is executed after completing the focus operation of said first focus operation mode, or set a second range as the predetermined range of said second focus operation mode in a case where said second focus operation mode is executed before completing the focus operation of said first focus operation mode.

6. A focus adjusting apparatus comprising:
   an extraction unit adapted to receive object light through a focus lens that performs focus adjustment, and extract a signal indicative of a focus level;
   a first focus operation mode adapted to perform focus operation by moving the focus lens while determining a focus level based on the signal extracted by said extraction unit, and when it is determined that the focus lens has passed a position where the focus level becomes maximum, returning and stopping the focus lens at the position where the focus level becomes maximum;
   a second focus operation mode adapted to perform focus operation by storing signals extracted by said extraction unit at each of a plurality of positions of the focus lens while moving the focus lens across a predetermined range in response to an operation of a shutter release operation member, and moving the focus lens to a position where the focus level becomes maximum in the stored signals; and a control unit adapted to set a first range as the predetermined range of said second focus operation mode in a case where the focus level obtained in said first focus operation mode is higher than a predetermined value, or set a second range as the predetermined range of said second focus operation mode in a case where the focus level obtained in said first focus operation mode is equal to or lower than the predetermined value.

7. The focus adjusting apparatus according to claim 6, wherein said first range is narrower than said second range.

8. The focus adjusting apparatus according to claim 6, wherein said first range includes the position where the focus level becomes maximum in said first focus operation mode.

9. The focus adjusting apparatus according to claim 6, wherein the signal indicative of the focus level is a signal that indicates a high-frequency-component state of the object light.

10. An image sensing apparatus comprising a focus adjusting apparatus which includes:

an extraction unit adapted to receive object light through a focus lens that performs focus adjustment, and extract a signal indicative of a focus level;

a first focus operation mode adapted to perform focus operation by moving the focus lens while determining a focus level based on the signal extracted by said extraction unit, and when it is determined that the focus lens has passed a position where the focus level becomes maximum, returning and stopping the focus lens at the position where the focus level becomes maximum;

a second focus operation mode adapted to perform focus operation by storing signals extracted by said extraction unit at each of a plurality of positions of the focus lens while moving the focus lens across a predetermined range in response to an operation of a shutter release operation member, and moving the focus lens to a position where the focus level becomes maximum in the stored signals; and a control unit adapted to set a first range as the predetermined range of said second focus operation mode in a case where the focus level obtained in said first focus operation mode is higher than a predetermined value, or set a second range as the predetermined range of said second focus operation mode in a case where the focus level obtained in said first focus operation mode is equal to or lower than the predetermined value.

11. A focusing method comprising:

an extraction step of receiving object light through a focus lens that performs focus adjustment and extracting a signal indicative of a focus level;

a first focus operation step of performing focus operation by moving the focus lens while determining a focus level based on the signal extracted in said extraction step, and when it is determined that the focus lens has passed a position where the focus level becomes maximum, returning and stopping the focus lens at the position where the focus level becomes maximum;

a second focus operation step of performing focus operation by storing signals extracted in said extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of said second focus operation step in a case where said second focus operation step is executed after completing the focus operation of said first focus operation step, or setting a second range as the predetermined range of said second focus operation step in a case where said second focus operation step is executed before completing the focus operation of said first focus operation step.

12. The focusing method according to claim 11, wherein said first range is narrower than said second range.

13. The focusing method according to claim 11, wherein said first range includes the position where the focus level becomes maximum in said first focus operation step.

14. The focusing method according to claim 11, wherein the signal indicative of the focus level is a signal that indicates a high-frequency-component state of the object light.

15. A focusing method comprising:

an extraction step of receiving object light through a focus lens that performs focus adjustment and extracting a signal indicative of a focus level;

a first focus operation step of performing focus operation by moving the focus lens while determining a focus level based on the signal extracted in said extraction step, and when it is determined that the focus lens has passed a position where the focus level becomes maximum, returning and stopping the focus lens at the position where the focus level becomes maximum;

a second focus operation step of performing focus operation by storing signals extracted in said extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of said second focus operation step in a case where the focus level obtained in said first focus operation step is higher than a predetermined value, or setting a second range as the predetermined range of said second focus operation step in a case where the focus level obtained in said first focus operation step is equal to or lower than the predetermined value.

16. The focusing method according to claim 15, wherein said first range is narrower than said second range.

17. The focusing method according to claim 15, wherein said first range includes the position where the focus level becomes maximum in said first focus operation step.

18. The focusing method according to claim 15, wherein the signal indicative of the focus level is a signal that indicates a high-frequency-component state of the object light.

19. A program which causes a computer to execute steps including:

an extraction step of receiving object light through a focus lens that performs focus adjustment and extracting a signal indicative of a focus level;

a first focus operation step of performing focus operation by moving the focus lens while determining a focus level based on the signal extracted in said extraction step, and when it is determined that the focus lens has passed a position where the focus level becomes maximum, returning and stopping the focus lens at the position where the focus level becomes maximum;

a second focus operation step of performing focus operation by storing signals extracted in said extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of said second focus operation step in a case where said second focus operation step is executed after completing the focus operation of said first focus operation step, or setting a second range as the predetermined range of said second focus operation step in a case where said second focus operation step is executed before completing the focus operation of said first focus operation step.

20. A program which causes a computer to execute steps including:

an extraction step of receiving object light through a focus lens that performs focus adjustment and extracting a signal indicative of a focus level;

a first focus operation step of performing focus operation by moving the focus lens while determining a focus level based on the signal extracted in said extraction step, and when it is determined that the focus lens has passed a position where the focus level becomes maximum, returning and stopping the focus lens at the position where the focus level becomes maximum;

a second focus operation step of performing focus operation by storing signals extracted in said extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of said second focus operation step in a case where the focus level obtained in said first focus operation step is higher than a predetermined value, or setting a second range as the predetermined range of said second focus operation step in a case where the focus level obtained in said first focus operation step is equal to or lower than the predetermined value.

21. A storage medium readable by a computer, said medium storing a program realizing:

an extraction step of receiving object light through a focus lens that performs focus adjustment and extracting a signal indicative of a focus level;

a first focus operation step of performing focus operation by moving the focus lens while determining a focus level based on the signal extracted in said extraction step, and when it is determined that the focus lens has passed a position where the focus level becomes maximum, returning and stopping the focus lens at the position where the focus level becomes maximum;

a second focus operation step of performing focus operation by storing signals extracted in said extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of said second focus operation step in a case where said second focus operation step is executed after completing the focus operation of said first focus operation step, or setting a second range as the predetermined range of said second focus operation step in a case where said second focus operation step is executed before completing the focus operation of said first focus operation step.

22. A storage medium readable by a computer, said medium storing a program realizing:

an extraction step of receiving object light through a focus lens that performs focus adjustment and extracting a signal indicative of a focus level;

a first focus operation step of performing focus operation by moving the focus lens while determining a focus level based on the signal extracted in said extraction step, and when it is determined that the focus lens has passed a position where the focus level becomes maximum, returning and stopping the focus lens at the position where the focus level becomes maximum;

a second focus operation step of performing focus operation by storing signals extracted in said extraction step at each of a plurality of positions of the focus lens while moving the focus lens across a predetermined range in response to an operation of a shutter release operation member, and moving the focus lens to a position where the focus level becomes maximum in the stored signals; and a control step of setting a first range as the predetermined range of said second focus operation step in a case where the focus level obtained in said first focus operation step is higher than a predetermined value, or setting a second range as the predetermined range of said second focus operation step in a case where the focus level obtained in said first focus operation step is equal to or lower than the predetermined value.

* * * * *

UNITED STATES PATENT AND TRADEMARK OFFICE
CERTIFICATE OF CORRECTION

| | |
|---|---|
| PATENT NO. | : 6,701,075 B2 |
| APPLICATION NO. | : 10/321056 |
| DATED | : March 2, 2004 |
| INVENTOR(S) | : Hiroyuki Ogino |

It is certified that error appears in the above-identified patent and that said Letters Patent is hereby corrected as shown below:

Col. 2, line 2  delete "go but of focus" and insert therefore  -- go out of focus --

Signed and Sealed this

Eighth Day of August, 2006

JON W. DUDAS
*Director of the United States Patent and Trademark Office*